(12) United States Patent
Dugaw et al.

(10) Patent No.: US 9,870,348 B1
(45) Date of Patent: *Jan. 16, 2018

(54) MAPPING BEHAVIOR TO DATA

(71) Applicant: Amazon Technologies, Inc., Reno, NV (US)

(72) Inventors: John Ingram Baker Dugaw, Covington, WA (US); Zachary Mohamed Shalla, Seattle, WA (US); Anand Victor, Bellevue, WA (US); Jeremy Boynes, Mercer Island, WA (US); Andrew Stuart Huntwork, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 813 days.

This patent is subject to a terminal disclaimer.

(21) Appl. No.: 14/160,099

(22) Filed: Jan. 21, 2014

Related U.S. Application Data

(63) Continuation of application No. 12/749,567, filed on Mar. 30, 2010, now Pat. No. 8,661,334.

(51) Int. Cl.
*G06F 17/00* (2006.01)
*G06F 17/22* (2006.01)

(52) U.S. Cl.
CPC ................ *G06F 17/2247* (2013.01)

(58) Field of Classification Search
CPC .................................................. G06F 17/2244
USPC ....................................................... 715/234
See application file for complete search history.

(56) References Cited

U.S. PATENT DOCUMENTS

| | | | |
|---|---|---|---|
| 6,973,625 B1 * | 12/2005 | Lupo | G06F 8/38 |
| | | | 715/744 |
| 7,171,673 B1 | 1/2007 | Steinman et al. | |
| 7,849,173 B1 | 12/2010 | Uhlik | |
| 8,006,180 B2 | 8/2011 | Tunning et al. | |
| 2003/0084059 A1 | 5/2003 | Kelley et al. | |
| 2003/0233631 A1 * | 12/2003 | Curry | G06F 8/20 |
| | | | 717/100 |
| 2005/0038645 A1 | 2/2005 | Mabey et al. | |
| 2005/0108625 A1 | 5/2005 | Bhogal et al. | |
| 2005/0165656 A1 * | 7/2005 | Frederick | G06Q 20/102 |
| | | | 705/26.1 |
| 2005/0198394 A1 | 9/2005 | Waldorf et al. | |
| 2005/0283352 A1 * | 12/2005 | Roller | G06Q 10/00 |
| | | | 703/22 |

(Continued)

OTHER PUBLICATIONS

Paul Strack, Form Validation Library v. 1.0.4, Feb. 2009.
Jesse Luehrs, Moose-2.0602, Conflicting Class, As indexed Jun. 2009.

*Primary Examiner* — Howard Cortes
(74) *Attorney, Agent, or Firm* — Thomas | Horstemeyer, LLP

(57) ABSTRACT

Disclosed are various embodiments for the mapping of behavior to data. Multiple behavior elements from a code library that are compatible with one or more data elements of a document are determined according to a data contract associated with each one of the behavior elements. Each of the behavior elements is configured to consume one or more data elements and produce a user interface feature. One or more of the behavior elements are selected according to one or more rules. A mapping of the selected behavior elements to the data elements is generated.

20 Claims, 3 Drawing Sheets

(56) References Cited

U.S. PATENT DOCUMENTS

| | | | |
|---|---|---|---|
| 2006/0122958 A1* | 6/2006 | Beisiegel | G06F 17/30699 |
| 2006/0179146 A1* | 8/2006 | Marucheck | G06F 9/465 709/227 |
| 2006/0206440 A1* | 9/2006 | Anderson | G06F 9/44505 705/500 |
| 2006/0271537 A1* | 11/2006 | Chandrasekharan | G06F 8/36 |
| 2007/0005777 A1 | 1/2007 | Fremantle et al. | |
| 2007/0083627 A1 | 4/2007 | Mohammed et al. | |
| 2008/0134089 A1* | 6/2008 | Adachi | G06F 3/0481 715/810 |
| 2010/0017853 A1* | 1/2010 | Readshaw | H04L 63/102 726/3 |
| 2010/0299218 A1 | 11/2010 | Aarru et al. | |
| 2011/0239104 A1* | 9/2011 | Prasad | G06F 11/3684 715/234 |

* cited by examiner

MAPPING BEHAVIOR TO DATA

CROSS-REFERENCE TO RELATED APPLICATIONS

This application is a continuation of, and claims priority to, co-pending U.S. Patent Application entitled "MAPPING BEHAVIOR TO DATA," filed on Mar. 30, 2010, and assigned application Ser. No. 12/749,567, which is incorporated herein by reference in its entirety.

BACKGROUND

Developers of network sites often want to include dynamic behavior within their network pages. To this end, developers may write customized code to be included within a network page to provide the desired dynamic behavior. Alternatively, developers may turn to code libraries containing standardized code segments that provide the desired dynamic behavior. Examples of such code libraries include jQuery and Dojo. Functions within such code libraries are statically linked to the data elements of a network page by the developer.

In the case of a centrally managed or shared network page server, users may be restricted from including customized code (e.g., JavaScript) within a network page. Such restrictions may be necessitated by security concerns. Allowing customized code within a network page may result in non-compliance with Payment Card Industry Data Security Standards (PCI DSS) or other security standards.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to the automatic mapping of behavior elements to data elements used in generating network pages. Various embodiments of the present disclosure alleviate the need for a user to "hard code" links to libraries that provide behavior elements for use within the network page. Further, the code segments implementing the behavior elements may be selected from a marketplace having marketplace rules and conditions. The marketplace may implement goals such as, for example, maintaining compliance with PCI DSS. Because the mapping between behavior elements and data elements is performed automatically, behavior elements may be selected from various providers based upon marketplace conditions such as cost, which may minimize costs to the developer of the network page. When behavior elements are updated in the future, the mapping may be regenerated automatically, without the need to update static linkages within network pages. In the following discussion, a general description of the system and its components is provided, followed by a discussion of the operation of the same.

Figure 1:
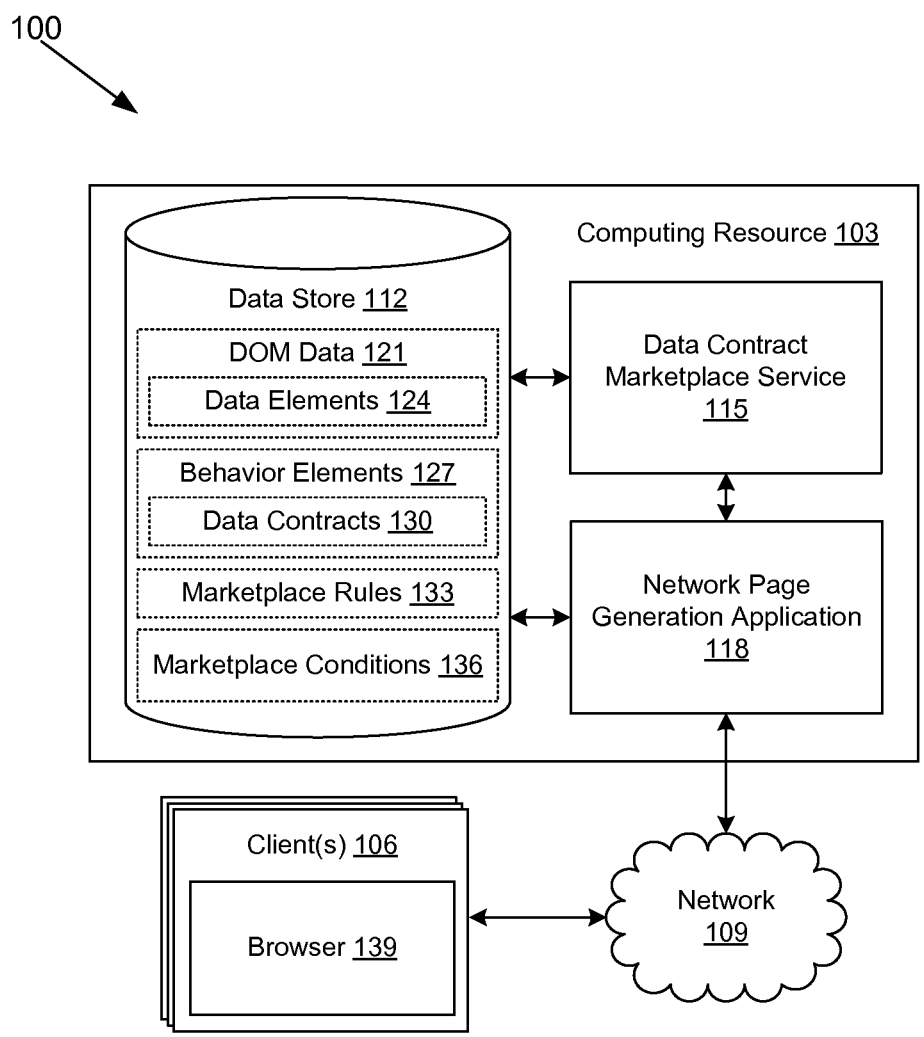
FIG. 1 is a drawing of a networked environment according to various embodiments of the present disclosure.

With reference to FIG. 1, shown is a networked environment 100 according to various embodiments. The networked environment 100 includes a computing resource 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing resource 103 may comprise, for example, a server computer or any other computing device or system providing computing capability. The computing resource 103 may represent multiple computer systems arranged, for example, in one or more server banks or other arrangements. To this end, the computing resource 103 may comprise, for example, a cloud computing resource, a grid computing resource, and/or any other distributed computing arrangement. Such computer systems may be located in a single installation or may be dispersed among many different geographical locations. In one embodiment, the computing resource 103 represents a virtualized computer system executed on one or more physical computing systems. For purposes of convenience, the computing resource 103 is referred to herein in the singular. However, in one embodiment, the computing resource 103 represents a plurality of computer systems arranged as described above.

Various applications and/or other functionality may be executed in the computing resource 103 according to various embodiments. Also, various data is stored in a data store 112 that is accessible to the computing resource 103. The data store 112 may be representative of a plurality of data stores as can be appreciated. The data stored in the data store 112, for example, is associated with the operation of the various applications and/or functional entities described below.

The components executed on the computing resource 103 include, for example, a data contract marketplace service 115, a network page generation application 118, and other applications, services, processes, systems, engines, or functionality not discussed in detail herein. The data contract marketplace service 115 is executed to automatically generate a mapping between behavior elements and data elements based on a data contract.

The network page generation application 118 is executed to generate network pages such as, for example, web pages, from a document object model (DOM) associated with the network page by applying behavior elements to data elements according to a mapping generated by the data contract marketplace service 115. The network page generation application 118 may include, or be executed in conjunction with, a network page server such as Apache HTTP Server, Microsoft® Internet Information Services, and/or some other server.

The data stored in the data store 112 includes, for example, DOM data 121, data elements 124, behavior elements 127, data contracts 130, marketplace rules 133, marketplace conditions 136, and potentially other data. The DOM data 121 includes one or more DOMs associated with network pages. Each DOM is a structured collection of a plurality of data elements 124. The data elements 124 may correspond to objects obtained from documents that are written in a document markup language. Non-limiting examples of document markup languages include hypertext markup language (HTML), extensible hypertext markup language (XHTML), extensible markup language (XML), and/or any other document markup language. As non-limiting examples, the data elements 124 of a DOM may comprise form input fields, images, blocks of text, buttons, frames, tables, and/or any other object from a DOM.

The behavior elements 127 may comprise code segments from a code library which may be applied to one or more data elements 124 from a DOM. Such code segments may take the form of functions, methods, subroutines, and so on. In various embodiments, the behavior elements 127 may implement dynamic HTML (DHTML) behaviors. Each of the behavior elements 127 is configured to consume at least one data element 124 and produce a network page feature according to a behavior. The behavior elements 127 may include server-side code and/or client-side code. Each of the behavior elements 127 is associated with one or more data contracts 130. A data contract 130 specifies which input data, or which types of data elements 124, are valid for a particular behavior element 127.

Non-limiting examples of behavior elements 127 may include address validation code, payment card validation code, spell-checking code, grammar-checking code, authentication code, network page layout code, roll-over help code, language translation code, search auto-completion code, and so on. In some embodiments, the behavior elements 127 stored within the data store 112 may include code that performs one or more service calls to one or more service providers.

A plurality of marketplace rules 133 may be provided to control which behavior elements 127 may be applied to which data elements 124 within a network page. As a non-limiting example, the marketplace rules 133 may define an incompatibility between a first behavior element 127 and a second behavior element 127. Such an incompatibility may be dictated, for example, by compliance with a standard such as PCI DSS or some other standard. As another non-limiting example, the marketplace rules 133 may require that all input text in a DOM be validated according to a set of behavior elements 127. One or more of the marketplace rules 133 may define a user request for a type of behavior to be applied to a set of the data elements 124 within a DOM.

The marketplace conditions 136 may include data that describes current conditions associated with using a behavior element 127 within a network page. In one embodiment, the marketplace conditions 136 may include data obtained from one or more computing devices operated by a third party. As a non-limiting example, marketplace conditions 136 may reflect economic conditions such as costs associated with each of the behavior elements 127 from a marketplace. In various embodiments, behavior elements 127 may be served up by differing providers and may involve, for example, service calls to different servers. Thus, different behavior elements 127 implementing a behavior may be associated with different costs. Further, behavior elements 127 may be associated with revenues. As a non-limiting example, a feature generated by a behavior element 127 may comprise an advertisement that produces revenue. Different advertisements may be associated with different revenues.

Additionally, marketplace conditions 136 may relate to network 109 bandwidth, client 106 computing capacity, client 106 display resolution, client 106 options such as whether, for example, JavaScript is enabled, and/or other conditions. Compared to marketplace rules 133, marketplace conditions 136 are based largely on external factors and may be more likely to change over time.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability.

The client 106 may be configured to execute various applications such as a browser 139 and/or other applications. The browser 139 may be executed in a client 106, for example, to access and render network pages, such as web pages, or other network content served up by the computing resource 103 and/or other servers. The browser 139 may be associated with various settings that control the rendering of network pages. As a non-limiting example, user settings in browser 139 may control whether JavaScript, Java, Flash, and/or other dynamic behavior is enabled. Also, browser 139 may support specific versions of JavaScript, Java, Flash, etc. The client 106 may be configured to execute applications beyond browser 139 such as, for example, email applications, instant message applications, and/or other applications.

Next, a general description of the operation of the various components of the networked environment 100 is provided. To begin, a user at a client 106 creates a document to be used in generating a network page. The document is uploaded over the network 109 to the computing resource 103 where it is stored in DOM data 121. A DOM may be obtained from the document and may be serialized and stored as DOM data 121 in one embodiment.

The document may specify a behavior to be applied to the data elements 124 of the DOM. The behavior may be selected from a code library comprising code that has been validated and audited. For example, the DOM may include a form to obtain an address. Such a form may comprise, for example, a plurality of input fields configured to receive an address line, a city, a state, a postal code, and potentially other data. The DOM may specify that the address is to be validated, although no address validation code is explicitly included within the DOM. Alternatively, or additionally, a marketplace rule 133, which may be system-wide or user-defined, may specify that all addresses are to be validated.

The data contract marketplace service 115 is executed to analyze the DOM and data contracts 130 associated with behavior elements 127 and to generate a mapping of behavior elements 127 to data elements 124. In one non-limiting example, one or more behavior elements 127 may be identified as providing address validation. To this end, the respective data contract 130 of the behavior elements 127 may describe valid input including an address line, a city, a state, a postal code, and other data used in specifying an address. The data contract marketplace service 115 is configured to automatically select at least one of the behavior elements 127 according to a plurality of marketplace rules 133 in order to produce at least one selected behavior element 127 which will be mapped to the data element 124.

An end user at a client 106 may request a network page from the network page generation application 118. Based on the mapping generated by the data contract marketplace service 115, the network page generation application 118 may apply the selected behavior elements 127 to the mapped data elements 124. This may involve, for example, embedding client-side code within a network page or reformatting the network page according to dynamically selected server-side code. Ultimately, as will be described in connection with FIG. 3, a network page is generated and sent to the user at the client 106 over the network 109.

In one embodiment, the mapping generated by the data contract marketplace service 115 is produced when a document is created or modified in the DOM data 121. In another embodiment, the mapping is generated automatically by the data contract marketplace service 115 in response to a request for a network page corresponding to a document stored in the DOM data 121. In yet another embodiment, the mapping is generated automatically by the data contract marketplace service 115 according to a predefined time interval.

Figure 2:
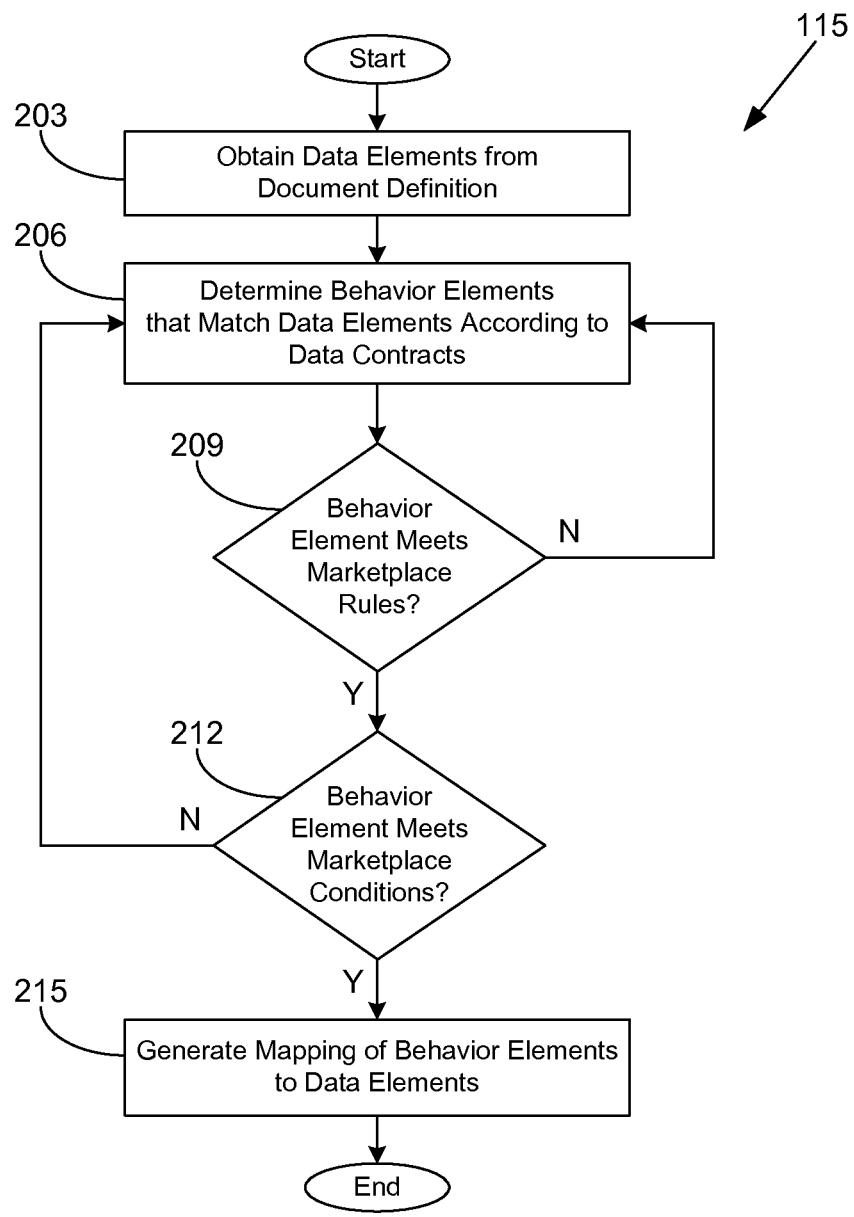
FIG. 2 is a flowchart illustrating one example of functionality implemented as portions of a data contract marketplace service executed in a computing resource in the networked environment of FIG. 1 according to various embodiments of the present disclosure.

Referring next to FIG. 2, shown is a flowchart that provides one example of the operation of a portion of the data contract marketplace service 115 according to various embodiments. It is understood that the flowchart of FIG. 2 is merely an example of the many different types of functional arrangements that may be employed to implement the operation of the portion of the data contract marketplace service 115 as described herein. As an alternative, the flowchart of FIG. 2 may viewed as depicting an example of steps of a method implemented in the computing resource 103 (FIG. 1) according to one or more embodiments.

Beginning with box 203, the data contract marketplace service 115 obtains the data elements 124 (FIG. 1) from a document definition such as, for example, a DOM stored in DOM data 121 (FIG. 1). Another non-limiting example of a document definition may comprise an XML configuration that determines which applications will execute to generate a document. In one embodiment, the data contract marketplace service 115 may unserialize stored objects representing a DOM from DOM data 121. In another embodiment, the data contract marketplace service 115 may read a stored document from DOM data 121 and dynamically generate a DOM. In various embodiments, the data elements 124 may comprise only those data elements 124 to which dynamic behaviors may be applied. In one embodiment, the data elements 124 may comprise code that is configured to generate data.

In box 206, the data contract marketplace service 115 determines one or more behavior elements 127 (FIG. 1) that match the data elements 124 according to the data contracts 130 (FIG. 1). In other words, the data contract marketplace service 115 determines behavior elements 127 from a code library that are compatible with at least one of the data elements 124 according to a data contract 130 associated with each one of the behavior elements 127. Each of the behavior elements 127 is configured to consume at least one data element 124 and produce a network page feature according to a behavior. Such a network page feature may comprise one or more data elements 124. The network page feature may comprise a modification of existing DOM attributes or cascading style sheet (CSS) elements, the inclusion of client-side functional code, and/or other features. The task of box 206 may be performed automatically, without either manual user intervention or a hard-coded mapping.

The data contract 130 defines which types of data elements 124 are compatible with, or may be matched to, a behavior element 127. As a non-limiting example, a DOM may include a set of data elements 124 that define an address, including a street address, a city, a state, a postal code, etc. An exemplary behavior element 127 that performs the behavior of address validation may consume an address and produce or modify user interface elements of a network page to indicate to the user whether the address has been successfully validated. If the address is not successfully validated, the user interface elements may elicit further input from the user.

As another non-limiting example, a DOM may include a data element 124 that defines a search input field. A behavior element 127 may have a data contract 130 specifying that it consumes a search input field and modifies the search input field to produce a search suggestion and automatic completion behavior. To this end, the behavior element 127 may comprise code that obtains the search suggestions asynchronously from a server using Ajax or a similar technology and renders a selection frame adjacent to the search input field within the network page. In box 206, the data contract marketplace service 115 performs this initial matching of the data elements 124 to behavior elements 127 that may be compatible.

Next, in box 209, the data contract marketplace service 115 determines whether a behavior element 127 meets the marketplace rules 133 (FIG. 1) that apply given a potential matching with one or more data elements 124. For example, the marketplace rules 133 may enforce compliance with a security standard such as PCI DSS or another security standard. When two mutually exclusive behavior elements 127 are matched with a set of data elements 124, the marketplace rules 133 may define which (if any) are selected. The output of the task of box 209 may be at least one behavior element 127 that has been automatically selected by the data contract marketplace service 115.

Code libraries are fragile by nature, and the inclusion of diverse segments of code from different code libraries may result in contemporaneous or future incompatibilities. Therefore, the marketplace rules 133 are used to externalize the task of matching code with data such that problems are avoided. The data contract marketplace service 115 is configured to match code (i.e., behavior elements 127) to data rather than to other code.

If the behavior element 127 does not meet the marketplace rules 133, the data contract marketplace service 115 returns to box 206 and processes another behavior element 127 if applicable. If instead, in box 209, the data contract marketplace service 115 determines that the behavior element 127 does meet the marketplace rules 133, the data contract marketplace service 115 proceeds to box 212 and determines whether the behavior element 127 also meets the marketplace conditions 136 (FIG. 1).

Marketplace conditions 136 are based on external factors that would influence a decision in mapping a particular behavior element 127 to a set of data elements 124. For example, a first behavior element 127 may be obtained through an external provider associated with a higher cost than a second behavior element 127 obtained through a different external provider. In some embodiments, the data contract marketplace service 115 may be configured to select the behavior element 127 associated with a lowest cost of the potential behavior elements 127. In one embodiment, the marketplace may facilitate competitive bidding with providers of behavior elements 127. Accordingly, market pressure may influence the selection of behavior elements 127.

In some embodiments, the marketplace conditions 136 include information regarding the capabilities of the client 106 (FIG. 1) with respect to the use of the behavior elements 127. When a client 106 is associated with a screen resolution of 800×600 pixels as a marketplace condition 136, the data contract marketplace service 115 may be configured to select a first behavior element 127 associated with an 800×600 pixel screen resolution instead of a second behavior element 127 associated with a 1024×768 pixel screen resolution. As another example, the marketplace conditions 136 may select from multiple rendering profiles, such as desktop, handheld, mobile, or other rendering profiles.

If, in box 212, the data contract marketplace service 115 determines that the behavior element 127 does not meet the marketplace conditions 136, the data contract marketplace service 115 returns to box 206 and begins processing another behavior element 127 if applicable. If the data contract marketplace service 115 determines, in box 212, that the behavior element 127 does meet the marketplace conditions 136, the data contract marketplace service 115 moves to box 215 and generates a mapping of behavior elements 127 to data elements 124. This mapping may be stored within the data store 112 in various embodiments. Thereafter, the data contract marketplace service 115 ends.

Figure 3:
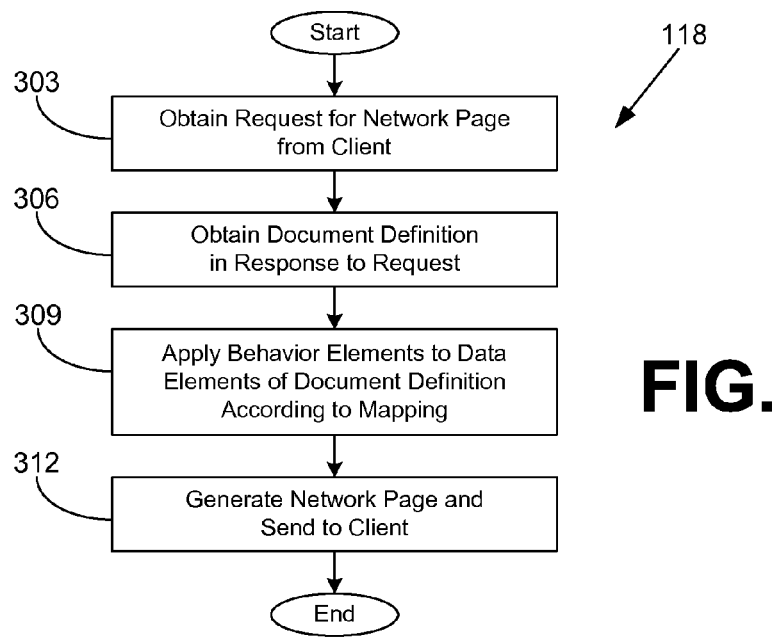
FIG. 3 is a flowchart illustrating one example of functionality implemented as portions of a network page generation application executed in a computing resource in the networked environment of FIG. 1 according to various embodiments of the present disclosure.

Referring next to FIG. 3, shown is a flowchart that provides one example of the operation of a portion of the network page generation application 118 according to various embodiments. It is understood that the flowchart of FIG. 3 provides merely an example of the many different types of functional arrangements that may be employed to implement the operation of the portion of the network page generation application 118 as described herein. As an alternative, the flowchart of FIG. 3 may be viewed as depicting an example of steps of a method implemented in a computing resource 103 (FIG. 1) according to one or more embodiments.

Beginning with box 303, the network page generation application 118 obtains a request for a network page from a client 106 (FIG. 1) over the network 109 (FIG. 1). Where the request is a hypertext transfer protocol (HTTP) request, the request may comprise a GET, POST, PUT, and/or other type of HTTP request. In box 306, the network page generation application 118 obtains a document definition in response to the request. As a non-limiting example of a document definition, a DOM may be obtained from the DOM data 121 (FIG. 1). As another non-limiting example of a document definition, an XML configuration may determine which applications will execute to generate various features of a network page. The DOM may correspond to the requested document and may be generated from the requested document using a library such as, for example, libxml2, Xerces, Simple API for XML (SAX), or another suitable library.

Next, in box 309, the network page generation application 118 applies behavior elements 127 (FIG. 1) to data elements 124 (FIG. 1) of the document definition according to a mapping generated by the data contract marketplace service 115 (FIG. 1). In one embodiment, the mapping is stored within the data store 112 (FIG. 1) and loaded when the network page is generated. In another embodiment, the mapping is generated in real-time when the network page is requested by a client 106.

To apply a behavior element 127 mapped to a data element 124, the network page generation application 118 may, for example, supply the data element 124 to the behavior element 127. In one embodiment, the network page generation application 118 (or the behavior element 127) may subsequently replace the data element 124 in the DOM with a transformed data element 124 produced by the behavior element 127. In another embodiment, the network page generation application 118 (or the behavior element 127) may modify the DOM to include code that implements a behavior surrounding the data element 124.

In box 312, the network page generation application 118 generates the network page that has been requested and then sends it over the network 109 to the client 106 for rendering in the client 106. Thereafter, the network page generation application 118 ends.

Figure 4:
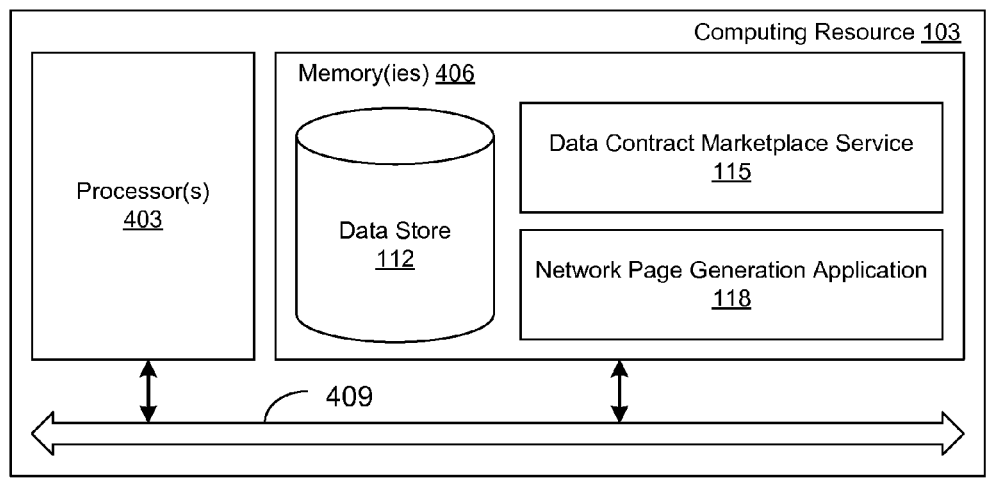
FIG. 4 is a schematic block diagram that provides one example illustration of a computing resource employed in the networked environment of FIG. 1 according to various embodiments of the present disclosure.

With reference to FIG. 4, shown is a schematic block diagram of the computing resource 103 according to an embodiment of the present disclosure. The computing resource 103 includes at least one processor circuit, for example, having a processor 403 and a memory 406, both of which are coupled to a local interface 409. To this end, the computing resource 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the data contract marketplace service 115, the network page generation application 118, and potentially other applications. Also stored in the memory 406 may be a data store 112 and other data. In addition, an operating system may be stored in the memory 406 and executable by the processor 403.

It is understood that there may be other applications that are stored in the memory 406 and are executable by the processors 403 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network 109 (FIG. 1) that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the data contract marketplace service 115, the network page generation application 118, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2 and 3 show the functionality and operation of an implementation of portions of the data contract marketplace service 115 and the network page generation application 118. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the data contract marketplace service 115 and the network page generation application 118, that comprises software or code can be embodied in any computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

For the Examiner's convenience, Applicant notes that this application is a continuation of U.S. application Ser. No. 12/749,567. The claims of the present application are different and possibly, at least in some aspects, broader in scope than the claims pursued in the parent application. To the extent any prior amendments or characterizations of the scope of any claim or cited document made during prosecution of the parent could be construed as a disclaimer of any subject matter supported by the present disclosure, Applicant hereby rescinds and retracts such disclaimer. Accordingly, the references previously presented in the parent applications may need to be revisited.

Therefore, the following is claimed:

1. A non-transitory computer-readable medium embodying a program that, when executed in at least one computing device, causes the at least one computing device to at least:
   determine a plurality of behavior elements of a code library that are compatible with a data element of a document object model according to respective data contracts associated with individual ones of the plurality of behavior elements, the respective data contracts identifying which input data is valid for the individual ones of the plurality of behavior elements, the individual ones of the plurality of behavior elements configured to consume at least one data element as input data and produce a user interface feature;

select a particular behavior element of the plurality of behavior elements according to a plurality of rules, the plurality of rules specifying at least one of: a compatibility between two or more of the plurality of behavior elements and a compatibility between at least one of the plurality of behavior elements and at least one data element;

generate a mapping of the selected particular behavior element to the data element; and apply the selected particular behavior element to the data element.

2. The non-transitory computer-readable medium of claim 1, wherein a particular rule of the plurality of rules is configured to enforce compliance with a data security standard.

3. The non-transitory computer-readable medium of claim 1, wherein a particular rule of the plurality of rules identifies a user request for a particular behavior to be applied to a set of data elements.

4. The non-transitory computer-readable medium of claim 1, wherein when executed the program further causes the at least one computing device to generate a user interface according to the document object model and the mapping, the user interface including the user interface feature.

5. The non-transitory computer-readable medium of claim 4, wherein the selected particular behavior element is applied to the data element when the user interface is generated.

6. A system, comprising:
a data store; and
at least one computing device in communication with the data store, the at least one computing device being configured to at least:
determine a plurality of behavior elements of a code library that are compatible with a data element of a document object model according to respective data contracts associated with individual ones of the plurality of behavior elements, the respective data contracts identifying which input data is valid for the individual ones of the plurality of behavior elements, the individual ones of the plurality of behavior elements configured to consume at least one data element as input data and produce a user interface feature;
select a particular behavior element of the plurality of behavior elements based at least in part on data describing current marketplace conditions;
generate a mapping of the selected particular behavior element to the data element; and
apply the selected particular behavior element to the data element.

7. The system of claim 6, wherein the particular behavior element comprises code configured to be executed in a client computing device.

8. The system of claim 6, wherein the data describing current marketplace conditions is obtained from at least one computing device operated by a third party.

9. The system of claim 6, wherein the data describing current marketplace conditions comprises respective costs associated with the individual ones of the plurality of behavior elements, and the at least one computing device is further configured to select the particular behavior element further based at least in part on the respective costs.

10. The system of claim 6, wherein the at least one computing device is further configured to select the particular behavior element further based at least in part on a first rule configured to enforce compliance with a data security standard and a second rule identifying a user request for a behavior to be applied to a set of data elements.

11. The system of claim 6, wherein the at least one computing device is further configured to generate a user interface according to the document object model and the mapping, the selected particular behavior element being applied to the data element in the user interface, the user interface including the user interface feature.

12. The system of claim 11, wherein the user interface comprises a network page, and the network page is generated in response to receiving a request for the network page from a client computing device.

13. The system of claim 6, wherein the selected particular behavior element is configured to perform at least one of: a spell check on at least one form input element, a roll-over help function, or an address validation on at least one address input element.

14. A method, comprising:
determining, via at least one of one or more computing devices, a plurality of behavior elements of a code library that are compatible with a data element of a document according to respective data contracts associated with individual ones of the plurality of behavior elements, the respective data contracts identifying which input data is valid for the individual ones of the plurality of behavior elements, the individual ones of the plurality of behavior elements configured to consume at least one data element as input data and produce a network page feature;
selecting, via at least one of the one or more computing devices, a particular behavior element of the plurality of behavior elements according to at least one rule, the at least one rule specifying at least one of: a compatibility between two or more of the plurality of behavior elements and a compatibility between at least one of the plurality of behavior elements and at least one data element;
generating, via at least one of the one or more computing devices, a mapping of the selected particular behavior element to the data element, and
applying, via at least one of the one or more computing devices, the selected particular behavior element to the data element.

15. The method of claim 14, wherein selecting the particular behavior element further comprises selecting, via at least one of the one or more computing devices, the particular behavior element based at least in part on data describing current marketplace conditions, the current marketplace conditions including respective costs associated with applying the individual ones of the plurality of behavior elements.

16. The method of claim 14, wherein the at least one rule is configured to enforce compliance with a data security standard.

17. The method of claim 14, wherein the at least one rule identifies an incompatibility between a first behavior element and a second behavior element of the plurality of behavior elements.

18. The method of claim 14, wherein the at least one rule comprises a plurality of rules.

19. The method of claim 14, wherein the document comprises a document object model.

20. The method of claim 14, further comprising:
receiving, via at least one of the one or more computing devices, a request for a network page from a client computing device; and generating, via at least one of the one or more computing devices, the network page according to the document and the mapping, the selected particular behavior element being applied to the data element in the network page.

* * * * *